United States Patent
Wood et al.

(10) Patent No.: US 8,029,946 B2
(45) Date of Patent: Oct. 4, 2011

(54) PRECONDITIONING TREATMENT TO ENHANCE REDOX TOLERANCE OF SOLID OXIDE FUEL CELLS

(75) Inventors: Anthony Wood, Calgary (CA); David Waldbillig, Vancouver (CA)

(73) Assignee: Versa Power Systems, Ltd., Calgary, Alberta (CA)

( * ) Notice: Subject to any disclaimer, the term of this patent is extended or adjusted under 35 U.S.C. 154(b) by 0 days.

(21) Appl. No.: 12/510,432

(22) Filed: Jul. 28, 2009

(65) Prior Publication Data
US 2010/0028747 A1 Feb. 4, 2010

Related U.S. Application Data

(62) Division of application No. 11/312,275, filed on Dec. 20, 2005, now abandoned.

(60) Provisional application No. 60/639,131, filed on Dec. 27, 2004.

(51) Int. Cl.
H01M 8/00 (2006.01)
H01M 8/12 (2006.01)
H01M 4/88 (2006.01)

(52) U.S. Cl. ........ 429/535; 429/423; 429/486; 429/527; 429/533

(58) Field of Classification Search .............. None
See application file for complete search history.

(56) References Cited

U.S. PATENT DOCUMENTS
2003/0124412 A1* 7/2003 Barnett et al. .............. 429/40

FOREIGN PATENT DOCUMENTS
EP 1 343 215 A1 9/2003

OTHER PUBLICATIONS

Redox cycling of Ni-YSZ anode investigated by TPR technique; Yun Zhang et al.; Solid State Ionics 176 (2005); pp. 2193-2199.*
Wood, A. et al., "Initial Testing of Solutions to Redox Problems with Anode-Supported SOFC", Journal of the Electrochemical Society, 153 (10) A1929-A1934 (2006).
Zhang, Yun et al., "Redox cycling of Ni-YSZ anode investigated by TPR techniques", Solid State Ionics, 176 (2005) 2193-2199.
Gut, B. et al., "Anode supported PEN for SOFC—Pressed substrates for spray pyrolysed and co-sintered electrolyte; Redox stability and alternative anode", Jahersbericht Energieforshung, (Dec. 15, 2001) pp. 1-6.
International Search Report and Written Opinion, PCT/IB2005/004154, dated Mar. 15, 2007, 12 pages.

* cited by examiner

*Primary Examiner* — Keith Walker
(74) *Attorney, Agent, or Firm* — Kilpatrick Townsend & Stockton LLP

(57) ABSTRACT

A high temperature, redox tolerant fuel cell anode electrode and method of fabrication in which the anode electrode is pre-conditioned by application of an initial controlled redox cycle to the electrode whereby an initial re-oxidation of the anode electrode is carried out at temperatures less than or equal to about 650° C.

6 Claims, 7 Drawing Sheets

PRECONDITIONING TREATMENT TO ENHANCE REDOX TOLERANCE OF SOLID OXIDE FUEL CELLS

This application is a divisional application of a U.S. patent application having Ser. No. 11/312,275 filed on 20 Dec. 2005, which is abandoned and claims the benefit of provisional U.S. patent application Ser. No. 60/639,131 filed 27 Dec. 2004.

BACKGROUND OF THE INVENTION

1. Field of the Invention

This invention relates to high temperature fuel cells having metal-containing anode electrodes, in particular, solid oxide fuel cells and, more particularly, to solid oxide fuel cell anode electrodes. More particularly yet, this invention relates to solid oxide fuel cell anode electrodes that are redox tolerant, solid oxide fuel cells comprising such electrodes, and a method for enhancing the redox tolerance of such electrodes.

2. Description of Related Art

Fuel cells are electrochemical devices that convert the chemical energy of a fuel into electrical energy with high efficiency. The basic physical structure of a fuel cell consists of an electrolyte layer with a porous anode electrode and porous cathode electrode on opposed sides of the electrolyte. In a typical fuel cell, gaseous fuels, typically hydrogen, are continuously fed to the anode electrode and an oxidant, typically oxygen from air, is continuously fed to the cathode electrode. The electrochemical reactions take place at the electrodes to produce an electric current.

In a solid oxide fuel cell, the electrolyte is a solid, nonporous metal oxide, normally $Y_2O_3$-stabilized $ZrO_2$ (YSZ), the anode electrode is a metal/YSZ cermet and the cathode electrode is typically Sr-doped $LaMnO_3$. The solid oxide fuel cell operating temperature is typically in the range of about 650° C. to about 1000° C., at which temperature ionic conduction by oxygen ions occurs.

The most commonly used solid oxide fuel cell anode material is a porous two phase nickel and yttria stabilized zirconia (Ni/YSZ) cermet. During normal fuel cell operation, this anode material remains a cermet. However, there are potentially several occurrences, such as air leakage into the anode side of the fuel cell due to seal leakage, fuel supply interruption, and emergency stops, which may cause the anode electrode to re-oxidize, forming an NiO/YSZ structure. Upon restarting of the fuel cell, the NiO/YSZ structure is chemically reduced to re-form the Ni/YSZ anode electrode. However, this reduction and oxidation process (referred to as redox cycling) results in substantial bulk volume changes of the anode electrode. The bulk volume of a fully dense NiO sample would be expected to contract by about 40.9% upon reduction and would be expected to expand by about 69.2% upon oxidation. Although, due to expansion into the pores, a NiO/YSZ solid oxide fuel cell anode electrode is unlikely to experience such a drastic volume change, any volume change that does occur can have a significant effect on the integrity of other cell components (e.g. electrolyte cracking) and cell component interfaces, which can, in turn, result in a significant degradation in the performance of the fuel cell.

SUMMARY OF THE INVENTION

It is, thus, one object of this invention to provide a solid oxide fuel cell having enhanced tolerance to the effects of redox cycling.

It is one object of this invention to provide a solid oxide fuel cell anode electrode having enhanced tolerance to the effects of redox cycling.

It is another object of this invention to provide a method for enhancing the redox tolerance of solid oxide fuel cell anode electrodes.

It is another object of this invention to provide a method for fabrication of a redox tolerant solid oxide fuel cell anode electrode.

These and other objects of this invention are addressed by a solid oxide fuel cell anode electrode comprising a porous metal-YSZ structure having a microstructure produced by applying an initial redox cycle to the structure where the re-oxidation step of the cycle is carried out at a temperature less than or equal to about 650° C.

These and other objects of this invention are also addressed by a method of fabricating a solid oxide fuel cell anode electrode comprising the steps of forming a mixture of metal oxide particles and YSZ particles into a "green" or uncured anode structure typically with binders and plasticizers, heating the green anode structure in air to a suitable sintering temperature, forming a sintered anode structure comprising the metal oxide and YSZ, contacting the sintered anode structure with a reducing agent at a temperature in the range of about 600° C. to about 1000° C., forming a reduced anode structure having a first microstructure, contacting the reduced anode structure with an oxidizing agent at a temperature in the range of about 400° C. to about 650° C., forming an oxidized anode structure, and contacting the oxidized anode structure with the reducing agent at a temperature in the range of about 600° C. to about 1000° C., forming said reduced anode structure with a second, redox tolerant, microstructure.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Although the invention is described herein in the context of solid oxide fuel cells and anode electrodes therefor, it will be appreciated by those skilled in the art that the basic principles of this invention may be advantageously applied to other high temperature fuel cells employing metal-containing anode electrodes that may be subject to redox cycling, and such other fuel cells and fuel cell components are deemed to be within the scope of this invention.

Figure 1:
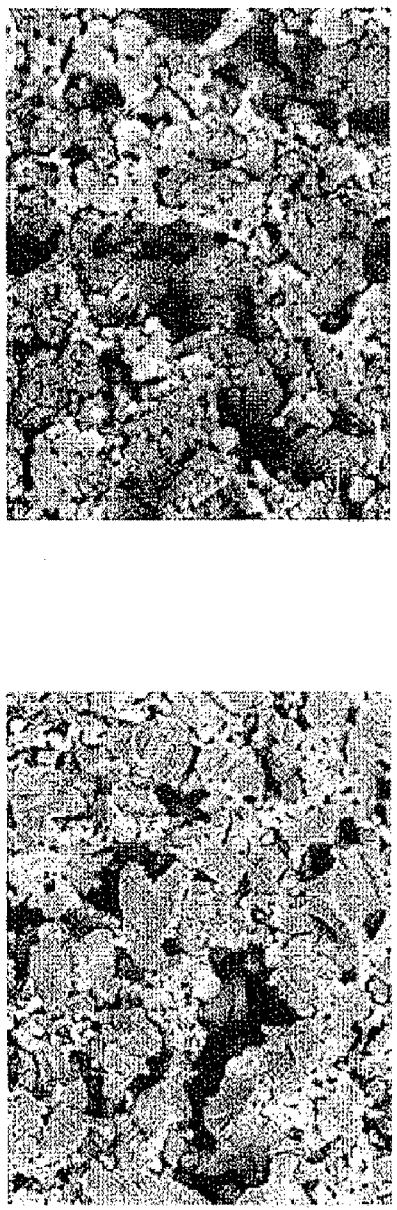
FIGS. 1a, 1b and 1c show BSE (backscattered electron) SEM (scanning electron microscope) images of a sintered (a), reduced (b) and re-oxidized (c) solid oxide fuel cell anode electrode.
Figure 2:
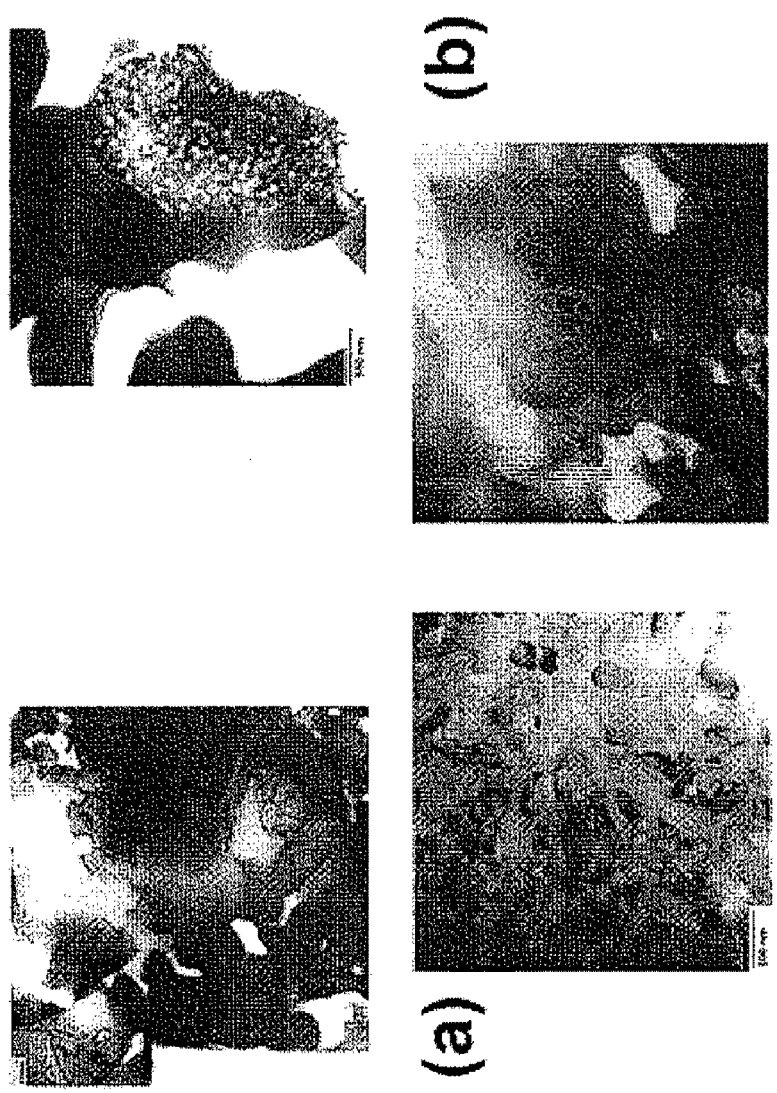
FIGS. 2a, 2b, 2c and 2d show TEM (transmission electron microscopy) images of a sintered (a), reduced (b), re-oxidized (c) and rereduced (d) solid oxide fuel cell anode electrode.

The invention disclosed herein is an anode electrode for a solid oxide fuel cell and a method for fabrication and preconditioning of the anode electrode which addresses the problems associated with redox cycling of the solid oxide fuel cell. FIGS. 1a, 1b and 1c show BSE SEM images of solid oxide fuel cell anodes in an as prepared, or sintered, state, after undergoing reduction by contact with a reducing gas, and after re-oxidation, respectively. FIGS. 2a, 2b, 2c and 2d show TEM images of solid oxide fuel cell anodes in an as prepared state, after undergoing a first reduction, after re-oxidation, and after a second reduction, respectively. As can be seen from these figures, redox cycling of a solid oxide fuel cell anode electrode irreversibly alters the anode electrode microstructure after the first redox cycle. As used herein, the first, or initial, redox cycle comprises the initial reduction of the sintered metal oxide/YSZ anode structure to produce the reduced anode structure followed by the initial re-oxidation of the reduced anode structure.

Electron microscopy of the anode electrode shows that, in the as prepared, i.e. sintered, condition, the anode electrode comprises NiO particles several microns in size, YSZ grains about one micron in size and intergranular porosity. After the first reduction, the overall Ni grain size remains about the same as the consumed NiO and epitaxial growth of Ni crystals on NiO grains is observed. The amount of intergranular porosity increases and very fine, 50 nanometer (nm), intergranular pores are formed throughout the Ni grains. This increase in the amount of porosity is due to the large volume change that occurs when NiO is reduced to Ni. When the anode electrode samples are re-oxidized, the NiO particles in the SEM images appear spongy with much smaller intergranular pores than the as prepared anode electrode samples. The re-oxidized anode electrode comprises smaller (less than about 100 nm), randomly oriented grains of NiO. The grain refinement that occurs upon re-oxidation is likely due to the large number of intragranular pores that occur upon reduction which serve as nucleation sites. Anode electrode samples reduced for a second time were also very fine grained (less than about 200 nm) and contained significant amounts of small intergranular porosity. The YSZ grains were unaffected by the redox cycles. The grain refinement and microstructural changes that occur after the first re-oxidation cycle significantly alter the anode microstructure. These changes also occur after every subsequent redox cycle, but the resulting microstructure is similar to the microstructure resulting from the initial re-oxidation. Thus, a new "redox cycled" equilibrium microstructure is formed after the first redox cycle.

Notwithstanding, we have found that subsequent redox cycling of solid oxide fuel cells in which the anode electrode has been preconditioned in accordance with this invention does not significantly affect the integrity of the other fuel cell components and fuel cell component interfaces and, thus, does not result in a significant degradation in the performance of the fuel cell.

Figure 3:
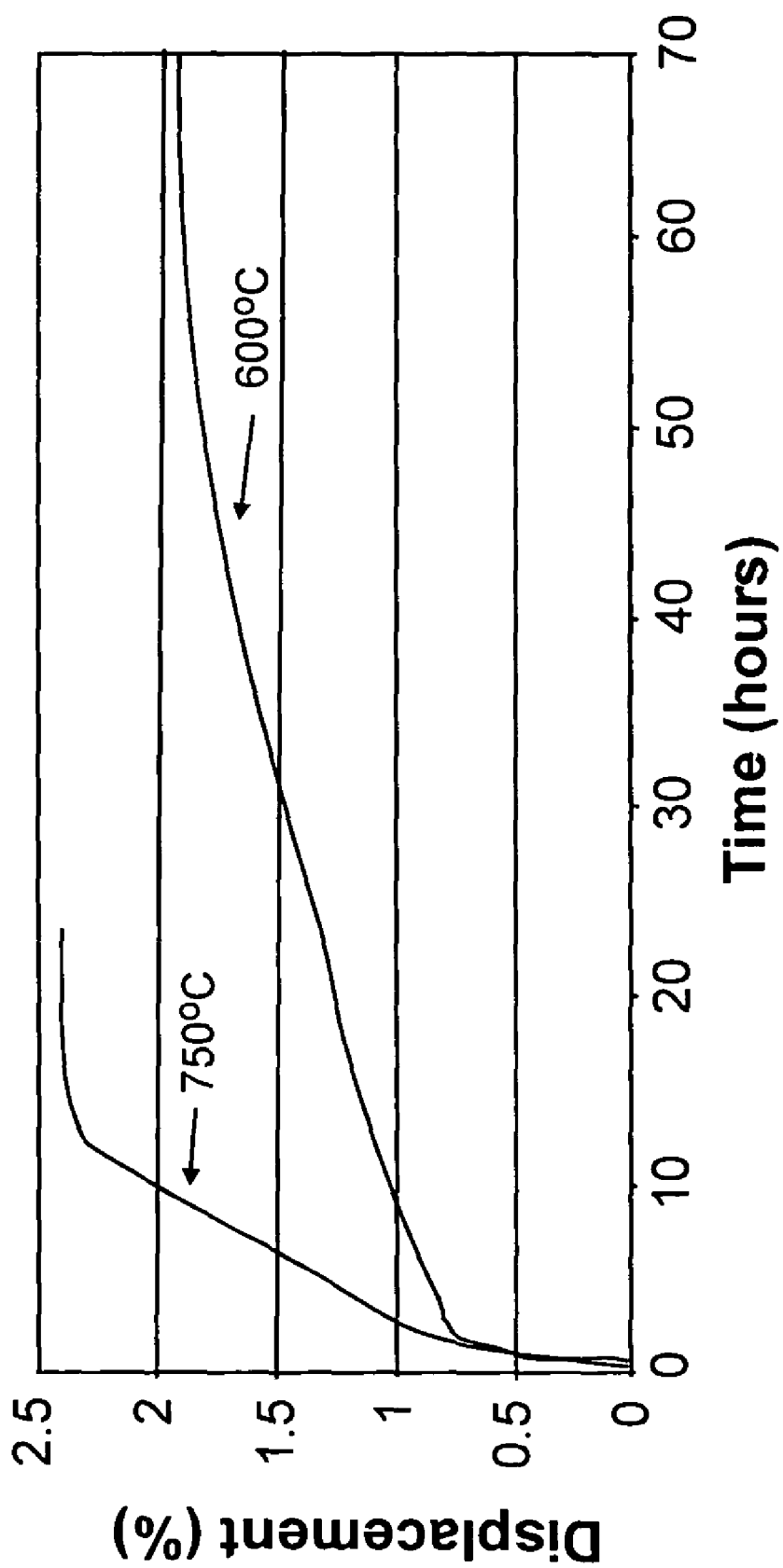
FIG. 3 is a diagram showing the results of a thermomechanical analysis (TMA) of solid oxide fuel cell anode electrode samples during oxidation at 600° C. and 750° C.

FIG. 3 shows the results of a thermomechanical analysis (TMA) of solid oxide fuel cell anode electrode samples subjected to oxidation at 600° C. and 750° C. As can be seen, the rate and amount of oxidation-induced expansion of the anode electrode sample was substantially reduced at 600° C. compared to expansion of the anode electrode at 750° C. By reducing the oxidation-induced expansion of the anode electrode, the undesirable impact of the expansion on the integrity of other fuel cell components and of the fuel cell component interfaces and, thus, on the cell performance degradation is significantly reduced.

Figure 4:
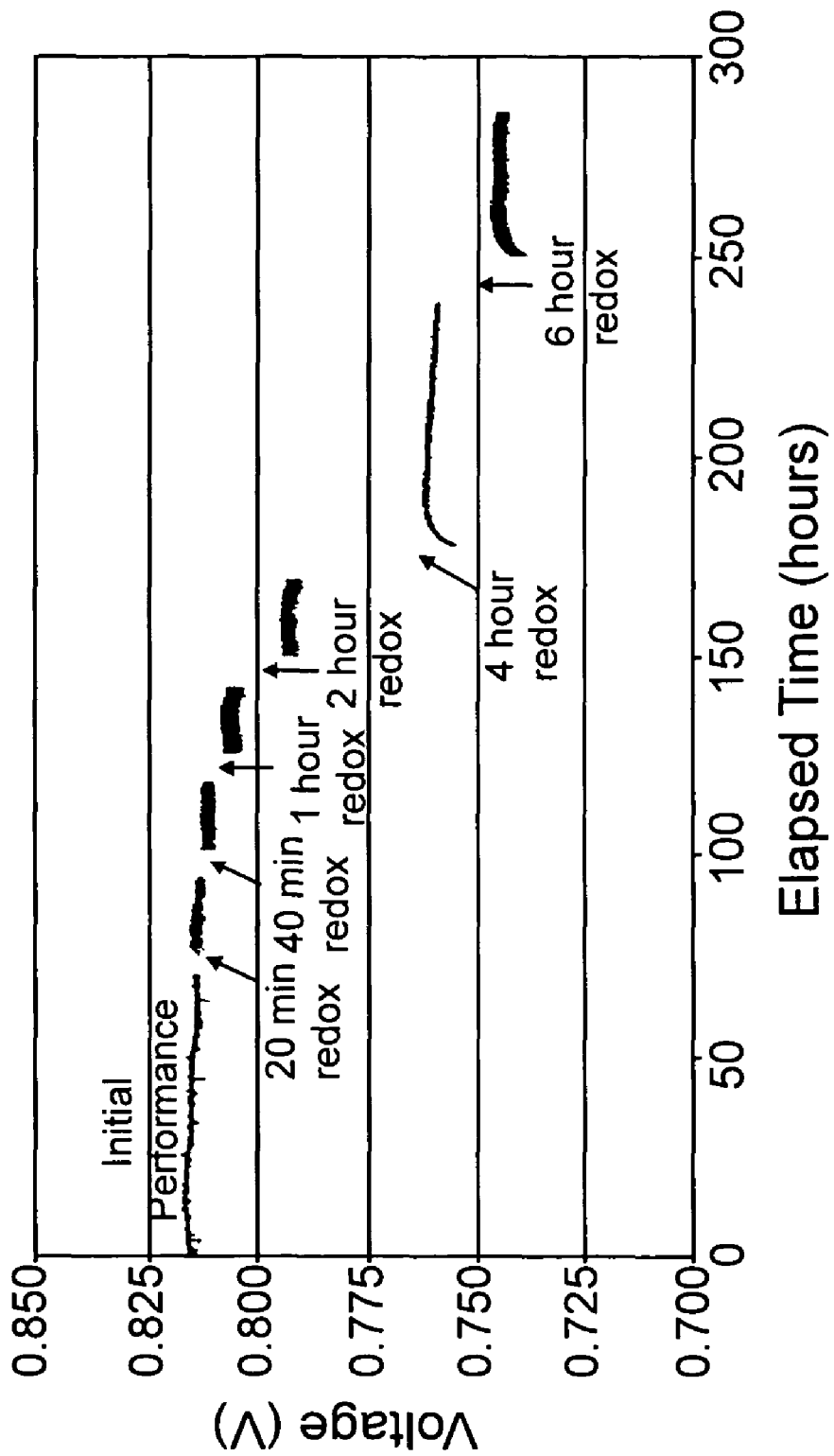
FIG. 4 is a diagram showing voltage degradation after redox cycling for a baseline solid oxide fuel cell.

The amount of electrochemical performance degradation of a solid oxide fuel cell after redox cycling was characterized using a single cell testing facility. The initial performance of the fuel cell was characterized, after which air was blown over the anode electrode for various amounts of time in order to re-oxidize the anode electrode. The anode electrode was then reduced and the electrochemical performance of the fuel cell was measured again. The results are shown in FIG. 4. Baseline testing of fuel cell redox tolerance showed that significant electrochemical performance degradation occurs at redox times greater than about 60 minutes, corresponding to a redox depth of about 30%, and that the greatest amount of redox-inducing degradation occurs after the first redox cycle to a 100% redox depth, occurring after 3.5 or more hours. 100% redox depth corresponds to all of the metal in the reduced anode electrode being re-oxidized.

Figure 5:
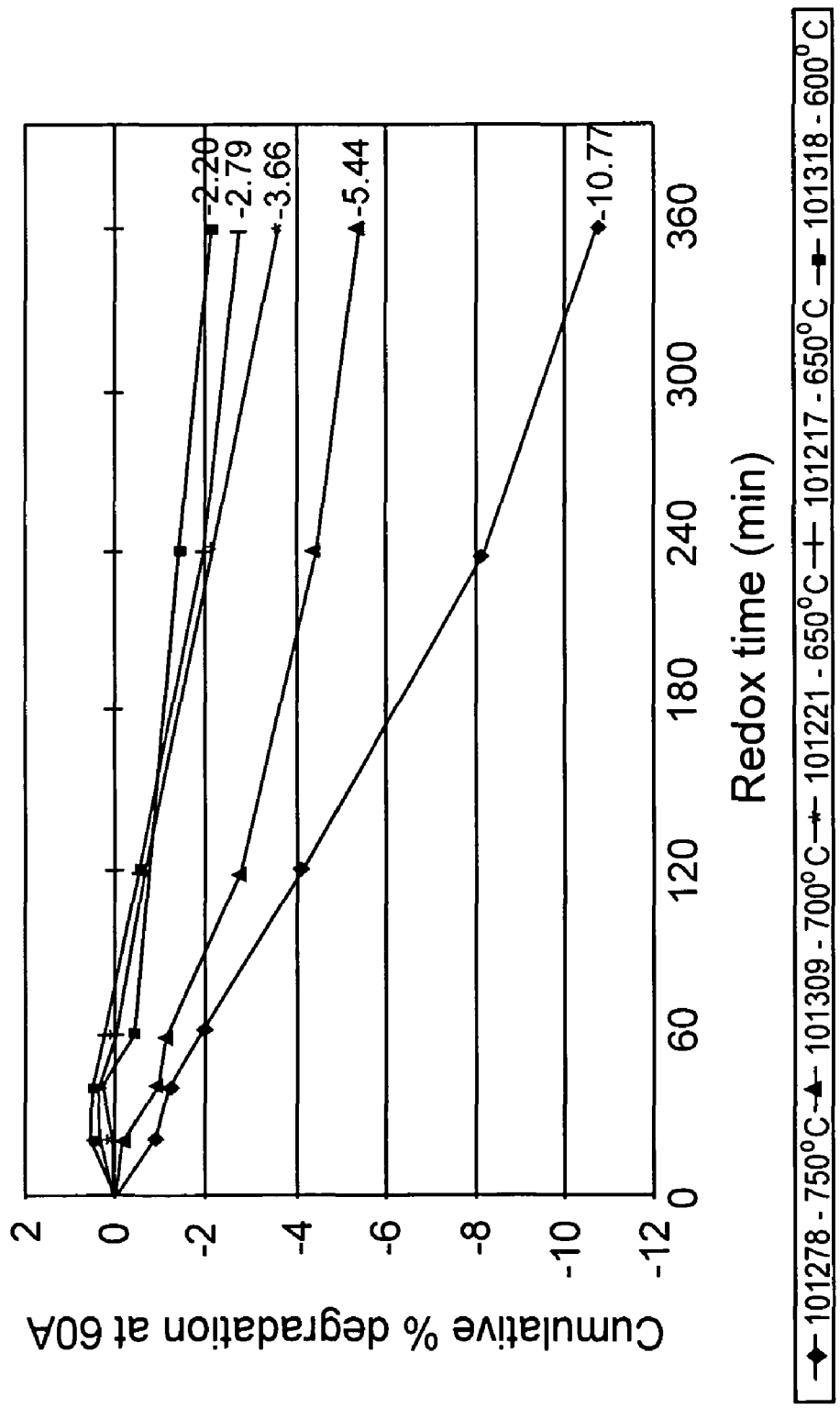
FIG. 5 is a diagram showing the cumulative degradation of a solid oxide fuel cell after redox cycling at various temperatures.

FIG. 5 shows the results of single cell tests with redox cycles performed at temperatures less than about 750° C. As can be seen, lowering the anode electrode oxidation temperature significantly lowered the amount of electrochemical performance degradation after redox cycling.

Thus, the combination of the TMA, SEM/TEM, baseline redox single cell tests and lower temperature single cell tests clearly suggests that the redox tolerance of the cell may be enhanced by a low temperature oxidation treatment, which acts to condition the microstructure of the anode electrode.

Figure 6:
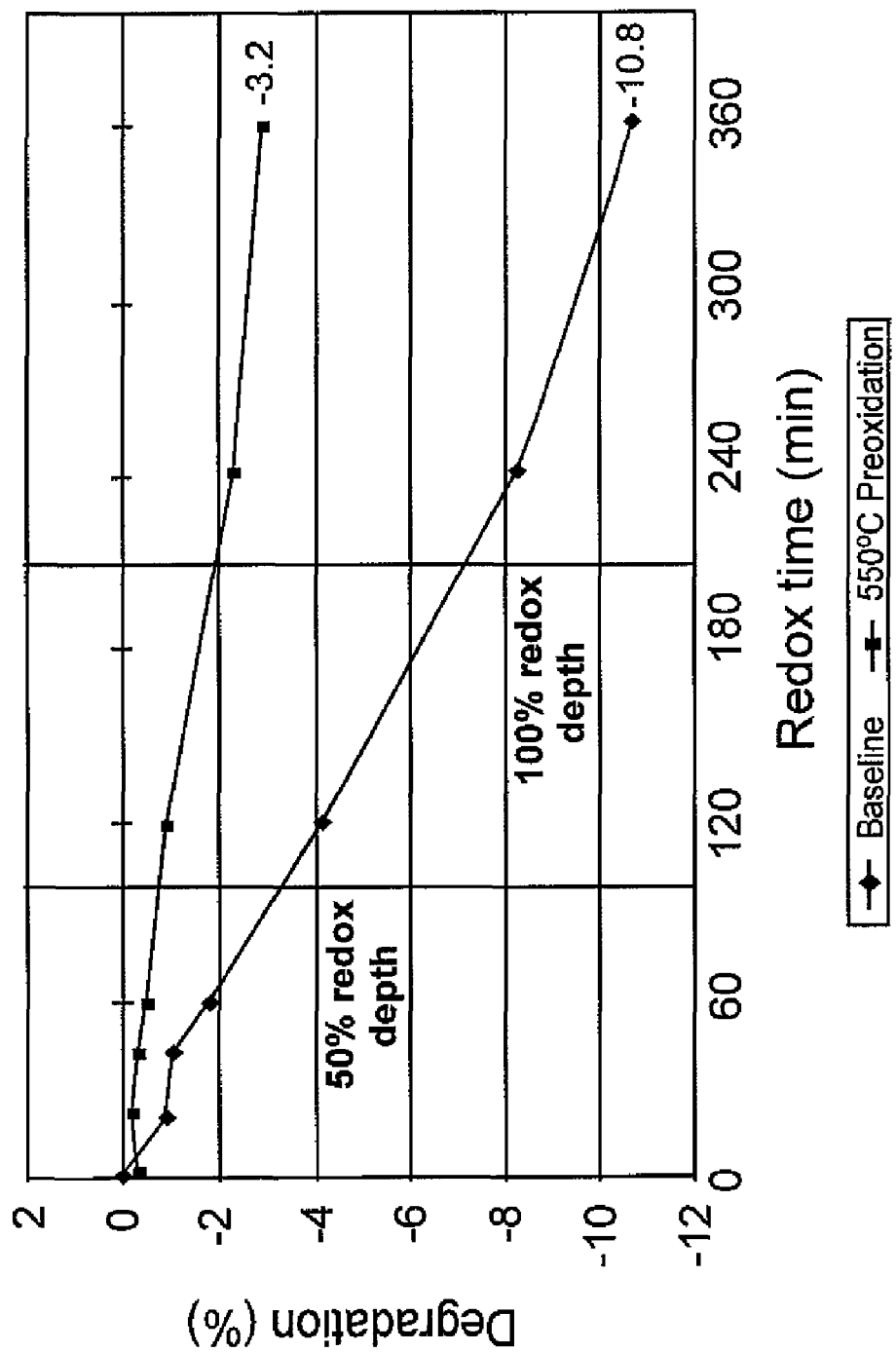
FIG. 6 is a diagram showing a comparison of the redox tolerance of a solid oxide fuel cell having a preconditioned anode electrode in accordance with one embodiment of this invention and a baseline solid oxide fuel cell.

FIG. 6 shows a comparison of cumulative percent electrochemical performance degradation versus redox time for a baseline redox cell test and a preconditioned cell test, that is, a test in which pre-oxidation of the electrode is carried out at temperatures less than about 600° C. As can be seen from the figure, preconditioning the anode electrode microstructure significantly enhances the cell redox tolerance compared to baseline test cells. The results represent an average of three tests for the baseline test cells and two tests for the pre-oxidized test cells. All tests were carried out at 750° C. and 0.74 A/cm$^2$.

Whereas FIG. 6 shows cumulative percentage degradation, Table 1 shows the data in numerical form as a percentage of voltage degradation per redox cycle. Comparison of the data easily shows that the first full redox cycle (greater than 100% oxidation depth, which means that more air is supplied to the electrode than is needed to oxidize all of the nickel in the electrode) causes the most degradation for baseline cells at 4.1% (Table 1). This is still the case for the pre-oxidized cell, but the value is only −0.9% degradation, thereby clearly showing that the pre-oxidation of the electrode conditions the electrode microstructure to lower further degradation.

TABLE 1

Comparison of Degradation from Thermal Cycling for Baseline and Pre-oxidized Cells

|  | Redox Time (min) | Redox Depth (%) | Degradation (%) Baseline Cells | Degradation (%) Pre-oxidized Cells |
| --- | --- | --- | --- | --- |
| Initial | 0 | 0 | 0.0 | 0.0 |
| Redox 1 | 20 | 10 | −0.1 | −0.3 |
| Redox 2 | 40 | 20 | −0.2 | −0.2 |
| Redox 3 | 60 | 30 | −0.7 | −0.2 |
| Redox 4 | 120 | 60 | −1.6 | −0.3 |
| Redox 5 | 240 | 120 | −4.1 | −0.9 |
| Redox 6 | 360 | 180 | −1.7 | −0.7 |

Figure 7:
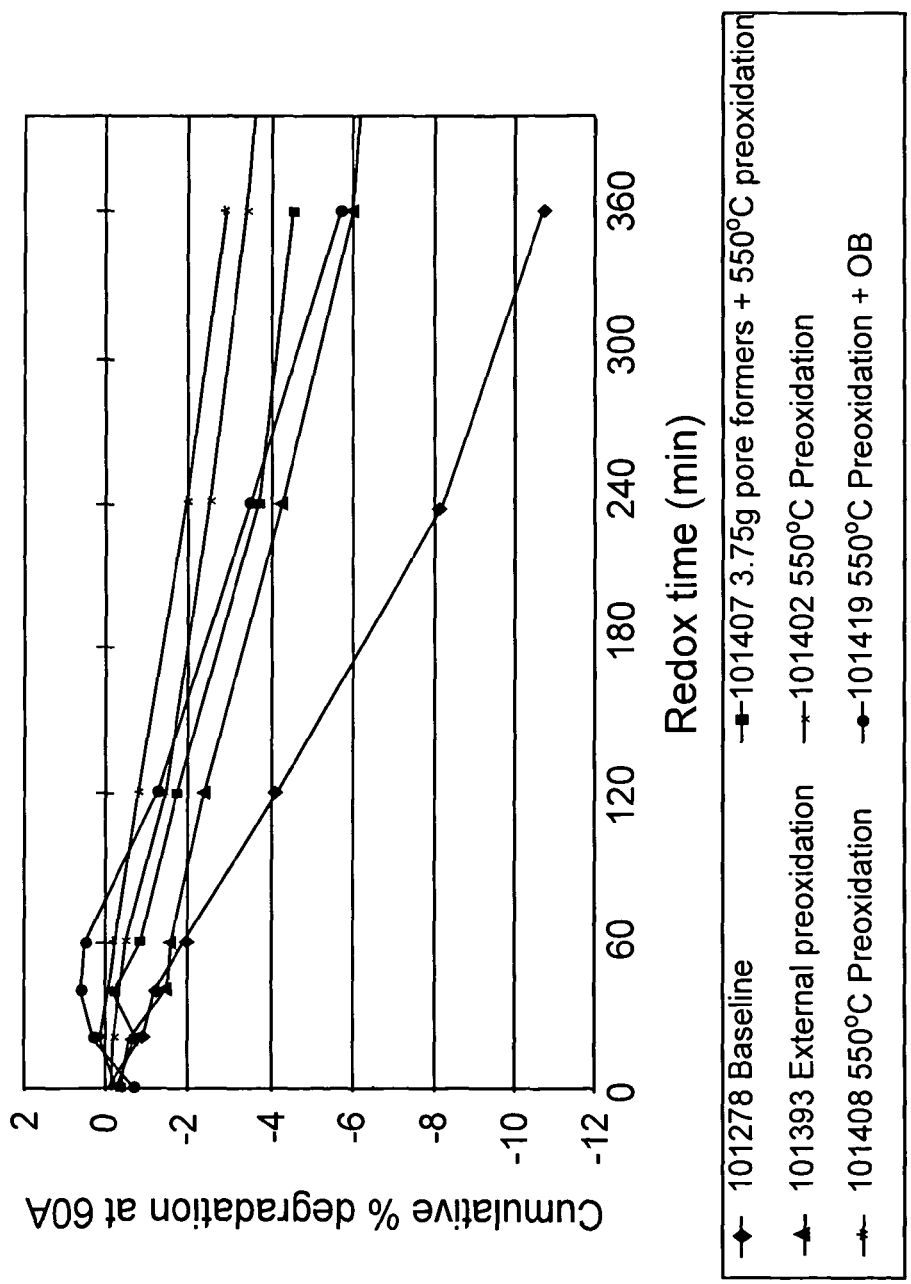
FIG. 7 is a diagram showing a cumulative % degradation comparison of solid oxide fuel cells having a baseline anode electrode and solid oxide fuel cells having preconditioned anode electrodes in accordance with this invention.

FIG. 7 shows the results of individual cell tests at the same condition for a range of pre-oxidized cell tests and a baseline test comparison. Several of these tests incorporate other redox enhancements, but it still can be seen that pre-oxidation alone produces the lowest redox degradation. This is likely due to interference with the pre-oxidation process from the other redox enhancements.

A key element for fabrication of a solid oxide fuel cell anode electrode in accordance with one embodiment of the method of this invention is subjecting the anode electrode metal oxide to a controlled initial redox cycle where the initial re-oxidation step takes place at temperatures of less than about 650° C. There are several stages in the fabrication of the anode electrode and/or fuel cell at which the controlled cycle may be applied. In accordance with one particularly preferred embodiment of this invention, the initial controlled redox cycling is carried out in-situ, that is, with the anode electrode as a component of an assembled fuel cell. Alternatively, in accordance with one embodiment of this invention, the initial redox cycling is carried out on the anode electrode structure prior to assembly of the fuel cell. In accordance with yet another embodiment of this invention, the redox cycling is applied to the mixture of metal oxide/YSZ particles prior to formation of the green anode structure or to the metal oxide powders alone prior to mixing with YSZ.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. In a solid oxide fuel cell having an anode electrode, a cathode electrode and a solid electrolyte disposed between said anode electrode and said cathode electrode, the improvement comprising:
    a redox tolerant anode electrode comprising a redox tolerant microstructure produced by preconditioning said anode electrode to at least a 100% redox depth with an initial re-oxidation of said anode electrode in an atmosphere of air at a temperature in a range of about 400° C. to about 650° C.

2. A solid oxide fuel cell in accordance with claim 1, wherein said anode electrode comprises Ni and YSZ.

3. A solid oxide fuel cell in accordance with claim 1, wherein said anode electrode is preconditioned in-situ.

4. A solid oxide fuel cell in accordance with claim 1, wherein said anode electrode is preconditioned prior to assembly into said solid oxide fuel cell.

5. A solid oxide fuel cell anode electrode comprising:
    a porous metal-YSZ structure having a microstructure produced by initially re-oxidizing said structure to at least a 100% redox depth in an atmosphere of air at a temperature in a range of about 400° C. to about 650° C.

6. A solid oxide fuel cell anode electrode in accordance with claim 5, wherein said metal is Ni.

* * * * *